United States Patent [19]

Lorenz

[11] Patent Number: 4,925,589

[45] Date of Patent: May 15, 1990

[54] AMIDE SIDE-CHAIN POLYMERS

[75] Inventor: Reinhard Lorenz, Bad Krozingen, Fed. Rep. of Germany

[73] Assignee: Hoffmann-La Roche Inc., Nutley, N.J.

[21] Appl. No.: 276,746

[22] Filed: Nov. 28, 1988

[30] Foreign Application Priority Data

Dec. 29, 1987 [CH] Switzerland ............... 5098/87
Oct. 21, 1988 [CH] Switzerland ............... 3920/88

[51] Int. Cl.$^5$ .................. C08F 26/02; C09K 19/52
[52] U.S. Cl. .................. 252/299.01; 526/312; 526/313; 428/1; 560/73
[58] Field of Search ........... 526/312, 313; 560/73; 428/1; 252/299.01

[56] References Cited

U.S. PATENT DOCUMENTS 4,696,990 9/1987 Noonan et al. ............... 526/312
4,702,945 10/1987 Etzbach et al. .
4,810,338 3/1989 DeMartino et al. ............ 526/312

FOREIGN PATENT DOCUMENTS 171045 2/1986 European Pat. Off. .

OTHER PUBLICATIONS

Springer-Verlag, Advances in Polymer Science, Liquid Crystal Polymers II/III, pp. 24, 25, 62, 63, 100–105, (1984).
Chem. Abstracts Structure RN:104452-53-1.
Chemical Abstracts CA107(22): 2089985.
Chemical Abstracts CA106(18): 147854x.
Chemical Abstracts CA(105) 16:135639x.
Finkelmann, H., Angew. Chem. 99; 840–848 (1987).
Finkelmann, H., Angew. Chem. Int. Ed. Enal. 26; 816–824 (1987).
Janini et al., Makromol Chem. Rapid Commun. 6; 55–63 (1985).

*Primary Examiner*—Joseph L. Schofer
*Assistant Examiner*—T. McDonald, Jr.
*Attorney, Agent, or Firm*—George M. Gould; Bernard S. Leon; George W. Johnston

[57] ABSTRACT

Polymers having a monomeric unit of the formula $$\left[ \begin{array}{c} -CH_2-CR^1- \\ | \\ CO-X^1-R^2-X^2- \end{array} \diagup\!\!\!\diagdown A \diagdown\!\!\!\diagup -Z^1- \\ -\diagup\!\!\!\diagdown B \diagdown\!\!\!\diagup \left( Z^2-\diagup\!\!\!\diagdown C \diagdown\!\!\!\diagup \right)_n R^3 \right] \quad (I)$$

wherein $R^1$ represents hydrogen, methyl, ethyl, fluorine, chlorine, bromine, cyano or phenyl; $X^1$ denotes oxygen, sulfur, $-NH-$ or $-N(CH_3)-$; $R^2$ is alkylene with 3–15 carbon atoms in which optionally a non-terminal methylene group is replaced by oxygen or sulfur; $X^2$ denotes a single covalent bond, oxygen or sulfur; rings A and B each independently represent 1,4-phenylene which is unsubstituted or substituted with halogen, methyl, methoxy and/or cyano and in which optionally one CH group or two CH groups is/are replaced by nitrogen; ring C represents 1,4-phenylene which is unsubstituted or substituted with halogen, methyl, methoxy and/or cyano and in which optionally one CH group or two CH groups is/are replaced by nitrogen or represents trans-1,4-cyclohexylene; n stands for the number 0 and $Z^1$ stands for $-CONH-$ or $-NHCO-$; or n stands for the number 1, one of the groups $Z^1$ and $Z^2$ represents $-CONH-$ or $-NHCO-$ and the other of the groups $Z^1$ and $Z^2$ denotes a single covalent bond, $-CH_2CH_2-$, $-CH_2O_3-$, $-OCH_2-$, $-N=N-$, $-CONH-$ or $-NHCO-$; and $R^3$ is hydrogen, halogen, cyano, nitro or an alkyl group in which optionally one methylene group or two non-adjacent methylene groups is/are replaced by oxygen and/or sulfur, as well as their preparation and their use in optics and for the separation of mixtures of substances.

16 Claims, No Drawings

AMIDE SIDE-CHAIN POLYMERS

BACKGROUND

1. Field of the Invention

The invention is directed to liquid crystal side-chain polymers.

The invention is concerned with side-chain polymers having an amide group in the side-chain, their preparation, the corresponding monomers, mixtures of the polymers with one another and/or with other materials and the use of the polymers and mixtures in optics, especially in integrated optics, in optoelectronics and/or for information storage, or for the separation of mixtures of substances, especially for separating membranes for the separation of mixtures of gases or as a stationary phase in gas chromatography.

2. Description

The anisotropic properties of liquid crystals can primarily be used technically in optoelectronics. In this connection, the electro-optical indicating devices based on low-molecular liquid crystal materials have acquired particular significance. In this case, the liquid crystal serves as a light relay, whereby in general the optical behavior of the liquid crystal layer is influenced by an applied electric field. Previous investigations with respect to liquid crystals have therefore been concerned mainly with materials having a low molecular weight having regard to their applicability in indicating devices. Recently, however, investigations have also been carried out into polymers which have so-called "mesogenic" groups in the main chain of the polymer (main-chain polymers) or attached side-chain-wise to the main chain of the polymer (side-chain polymers). As the mesogen there are generally denoted groups which have a pronounced form-anisotropy and especially a rod-like or disc-like structure, since the corresponding low molecular compounds often have liquid crystalline properties [Angew. Chemie 99, 840 (1987)]. Main-chain polymers can usually form fibres of high tensile strength by parallel arrangement of the mesogenic groups. On the other hand, the lateral arrangement of the mesogenic groups in an ideal situation can lead to materials which have properties not only of polymers, but also of liquid crystals.

As materials having anisotropic properties, liquid crystal side-chain polymers are of great potential interest for the most varied technological fields. The anisotropic properties can often be modified considerably depending on the preparation and pre-treatment. For example, anisotropic glasses can be obtained by freezing the anisotropic phase or single crystals can also be obtained after previous macroscopic orientation with electric or magnetic fields. Further for example, the anisotropic properties of elastomers can also be influenced by mechanical deformation. Side-chain polymers are therefore of particular interest for optical applications, for example, as optical building elements in linear and nonlinear optics, as optical storage elements and the like. On the other hand, liquid crystalline side-chain polymers are often suitable as stationary phases in gas chromatography or especially the elastomers are also suitable for the preparation of separating membranes. Further development in these fields depends essentially on the availability of specific and efficient materials.

Low molecular compounds having an amide bridging group between two rings generally have relatively high melting points. As a rule, they have no liquid crystal properties or only insufficient liquid crystal properties and have hitherto been used to a small extent. The known main-chain polymers, which have in the monomeric unit an amide bridging group between 2 rings, melt only at very high temperatures or can not be melted at all and therefore can be processed only with difficulty. Further, from Makromol. Chemie, Rapid. Commun. 6, 57–63 there is known a polysiloxane having an amide group in the side-chain, but this however, also melts only at very high temperatures with decomposition.

SUMMARY OF THE INVENTION

The invention is concerned with a polymer, which is characterized in that it has as the monomeric unit a group of the formula

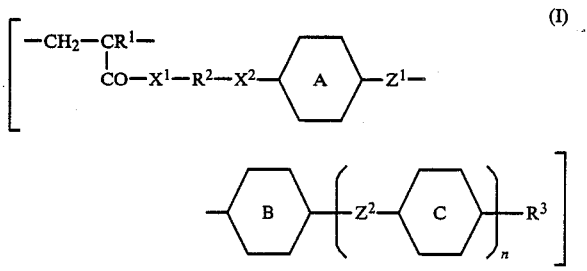

wherein $R^1$ represents hydrogen, methyl, ethyl, fluorine, chlorine, bromine, cyano or phenyl; $X^1$ denotes oxygen, sulfur, —NH— or —N(CH$_3$)—; $R^2$ is alkylene with 3–15 carbon atoms in which optionally a non-terminal methylene group is replaced by oxygen or sulfur; $X^2$ denotes a single covalent bond, oxygen or sulfur; rings A and B each independently represent 1,4-phenylene which is unsubstituted or substituted with halogen, methyl, methoxy and/or cyano and in which optionally one CH group or two CH groups is/are replaced by nitrogen; ring C represents 1,4-phenylene which is unsubstituted or substituted with halogen, methyl, methoxy and/or cyano and in which optionally one CH group or two CH groups is/are replaced by nitrogen or represents trans-1,4-cyclohexylene; n stands for the number 0 and $Z^1$ stands for —CONH— or —NHCO—; or n stands for the number 1, one of the groups $Z^1$ and $Z^2$ represents —CONH— or —NHCO— and the other of the groups $Z^1$ and $Z^2$ denotes a single covalent bond, —CH$_2$CH$_2$—, —CH$_2$O—, —OCH$_2$—, —N=N—, —CONH— or —NHCO—; and $R^3$ is hydrogen, halogen, cyano, nitro or an alkyl group in which optionally one methylene group or two non-adjacent methylene groups is/are replaced by oxygen and/or sulfur.

The polymers in accordance with the invention are hydrolytically and thermally very stable. Compared with the previously known polymers based on "mesogenic" amide groups, they have surprisingly low melting points and can therefore be processed readily. On the other hand, they usually exhibit a pronounced tendency to crystallize and can therefore be readily obtained below the melting point as polymers having a high internal order. Further, the polymers in accordance with the invention have relatively high clearing points and, when they are glassy, high glass transition temperatures. If desired, the crystallization can be completely or partially suppressed by copolymerization and/or by admixture with other materials. Accordingly, the polymers in accordance with the invention have a broad range of application and are especially suitable for use in fields in which materials having anisotropic properties are required. Depending on the choice of the repeating monomeric unit of formula I and, if desired, by reaction with comonomers and/or admixture of other materials there can be obtained crystals, glasses, elastomers and/or liquid crystalline phases having in each case large thermal ranges of application.

DETAILED DESCRIPTION OF THE INVENTION

The invention is directed to a polymer comprising a monomeric unit of the formula

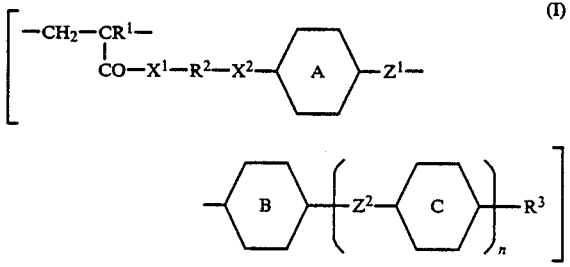

wherein $R^1$ is hydrogen, methyl, ethyl, fluorine, chlorine, bromine, cyano or phenyl; $X^1$ is oxygen, sulfur, —NH— or —N(CH$_3$)—; $R^2$ is alkylene with 3–15 carbon atoms, or alkylene with 3–15 carbon atoms in which a non-terminal methylene group thereof is replaced by oxygen or sulfur; $X^2$ is a single covalent bond, oxygen or sulfur; each of rings A and B independently is 1,4-phenylene which is unsubstituted or substituted with at least one of halogen, methyl, methoxy or cyano, or said unsubstituted or substituted 1,4-phenylene in which one CH group or two CH groups thereof is/are replaced by nitrogen; ring C is 1,4-phenylene which is unsubstituted or substituted with at least one of halogen, methyl, methoxy or cyano or said unsubstituted or substituted 1,4-phenylene in which optionally one CH group or two CH groups thereof is/are replaced by nitrogen or is trans-1,4-cyclohexylene; n is the integer 0, and $Z^1$ is —CONH— or —NHCO—; or n is the integer 1, one of the groups $Z^1$ and $Z^2$ is —CONH— or —NHCO—, and the other of the groups $Z^1$ and $Z^2$ is a single covalent bond, —CH$_2$CH$_2$—, —CH$_2$O—, —OCH$_2$—, —N=N—, —CONH— or —NHCO—; and $R^3$ is hydrogen, halogen, cyano, nitro, or alkyl in which one methylene group or two non-adjacent methylene groups thereof is/are replaced by at least one of oxygen or sulfur.

The above term "non-terminal methylene group" is intended to exclude methylene groups adjacent to $X^1$ or $X^2$ and methyl groups (in the case of branched alkylene $R^2$) that is, non-terminal methylene groups are linked with 2 carbon atoms.

The term "halogen" embraces fluorine, chlorine, bromine and iodine.

The term "1,4-phenylene which is unsubstituted or substituted with halogen, methyl, methoxy and/or cyano and in which optionally one CH group or two CH groups is/are replaced by nitrogen" embraces 1,4-phenylene as well as groups derived therefrom having lateral halogen, methyl, methoxy and/or cyano substituents and/or having one or two nitrogen atoms in the ring such as fluoro-1,4-phenylene, chloro-1,4-phenylene, methyl-1,4-phenylene, methoxy-1,4-phenylene, cyano-1,4-phenylene, 2,3-difluoro-1,4-phenylene, pyridine-2,5-diyl, pyrazine-2,5-diyl, pyrimidine-2,5-diyl, pyridazine-3,6-diyl and the like.

The term "alkyl group in which optionally one methylene group or two non-adjacent methylene groups is/are replaced by oxygen and/or sulfur" embraces straight-chain and branched, optionally chiral, groups. Examples of such groups are alkyl, alkoxy, alkylthio, alkoxyalkyl, alkylthioalkyl and alkoxyalkoxy such as methyl, ethyl, propyl, isopropyl, 1-methylpropyl, isobutyl, butyl, 2-methylbutyl, pentyl, 3-methylpentyl, hexyl, heptyl, octyl, nonyl, decyl, undecyl, dodecyl, methoxy, ethoxy, propyloxy, isopropyloxy, 1-methylpropyloxy, butyloxy, 2-methylbutyloxy, pentyloxy, 3-methylpentyloxy, hexyloxy, heptyloxy, octyloxy, nonyloxy, decyloxy, undecyloxy, dodecyloxy, methylthio, ethylthio, propylthio, butylthio, pentylthio, hexylthio, heptylthio, methoxymethyl, ethoxymethyl, propyloxymethyl, methoxyethyl, methoxypropyl, methylthiomethyl, ethylthiomethyl, methylthioethyl, methoxymethoxy, ethoxymethoxy, methoxyethoxy and the like.

The novel side-chain polymers can be prepared in accordance with the invention by polymerizing a monomer of the formula

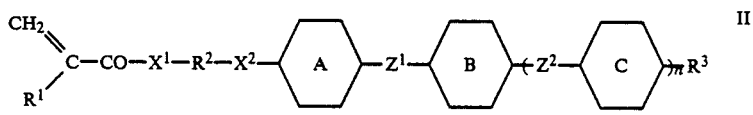

wherein $R^1$, $R^2$, $R^3$, $X^1$, $X^2$, $Z^1$, $Z^2$, n and rings A, B and C have the significances given in formula I, alone or together with comonomers.

The polymerization can be effected in a manner known per se, preferably by radical polymerization, and under usual conditions. Generally, the reaction is advantageously carried out in an inert organic solvent, for example in an ether, an alcohol, an optionally chlorinated, saturated or aromatic hydrocarbon, an amide, a urea derivative or a sulfoxide, such as tetrahydrofuran, methanol, ethanol, hexane, chloroform, benzene, toluene, xylene, chlorobenzene, dimethylformamide, diethylformamide, N-methylpyrrolidone, hexamethylphosphoric acid triamide, tetramethylurea, N,N′-dimethyl-N,N′-propyleneurea, dimethyl sulfoxide and the like. A solution precipitation polymerization is generally observed in alcohols and aromatic solvents. However, in many applications solvents in which the polymer is soluble, for example amides, urea derivatives and sulfoxides, are preferred.

The polymerization can be induced, for example, photochemically, thermally and/or with radical formers. Usual compounds such as azoisobutyronitrile, benzoyl peroxide and the like can be used as the radical former. Radical formers which decompose at about 50°–150° C. or at a higher temperature are generally preferred. The photochemically induced polymerization can be effected for example, by UV irradiation in the presence of usual photoinitiators such as benzophenone, acetophenone, ω,ω-dimethoxy-ω-phenylacetophenone, benzoin and the like.

The degree of polymerization can be influenced especially via the monomer concentration, but it also depends on the monomer of formula II which is used, comonomers which may be present, the initiator concentration, the solvent and the temperature. The number average of the molecular weight of the polymer (measured by gel permeation chromatography with dimethylformamide and polystyrene standards) can be varied by such means, for example in a range of about 5000–2000000 g/mol, preferably about 10000–200000 g/mol and particularly about 20000–120000. The concentration of monomer of formula II in the reaction mixture can be preferably about 3–20 wt. %, for example about 10 wt. %, based on the solvent. The initiator concentration is typically about 0.1–4.0 wt. %, for example about 1 wt. %, based on the monomer of formula II.

The polymerization can be carried out under usual conditions, for example at about 0°–150° C. and under normal pressure. When a radical initiator is used, the temperature should, however, preferably lie in the thermal decomposition range of the radical initiator.

Depending on the product which is desired, the polymerization is effected as a homopolymerization of a monomer of formula II or as a copolymerization of a monomer of formula II with one or more additional comonomers of formula II and/or other comonomers. Other comonomers which are suitable are known to the person skilled in the art. There are generally preferred comonomers which have a group having the desired properties, for example, a mesogenic group, a group with non-linear optical properties, a color radical, etc., attached to a polymerizable group via a spacer. Further, cross-linked polymers can also be obtained in a manner known per se by using comonomers having 2 or more polymerizable groups. Furthermore, polymers having reactive groups can be prepared according to methods known per se by using comonomers which have a reactive, but not polymerizable, group in addition to the polymerizable group. Suitable reactive groups (for example, isocyanate, oxacyclopropyl, hydroxy, carboxy) and monomers are fundamentally known to the person skilled in the art. They permit especially, after polymerization has been effected, the introduction of covalently bonded coloring substances and/or compounds having non-linear optical properties, the introduction of additional mesogenic groups and the cross-linking of the polymer. The reaction of reactive groups which may be present in the polymer by polymer-analogous reactions can be effected in a manner known per se.

The monomers of formula II are novel and are also an object of the present invention.

The compounds of formula II can be produced by
(a) for the production of the compounds of formula II in which $Z^1$ stands for —CONH— or —NHCO—, reacting a compound of the formula

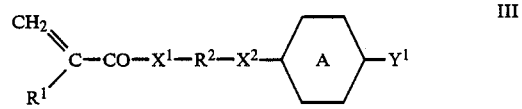

and a compound of the formula

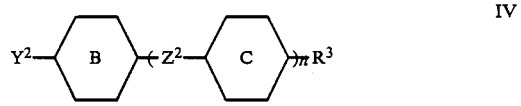

wherein one of the groups $Y^1$ and $Y^2$ stands for —COOH and the other of the groups $Y^1$ and $Y^2$ stands for —NH$_2$, $Z^2$ denotes a single covalent bond, —CH$_2$CH$_2$—, —CH$_2$O—, —OCH$_2$—, —N≡N—, —CONH— or —NHCO— and $R^1$, $R^2$, $R^3$, $X^1$, $X^2$, n and rings A, B and C have the significances given in formula II, or suitable derivatives of these compounds, or (b) for the production of the compounds of formula II in which n stands for the number 1 and $Z^2$ stands for —CONH— or —NHCO—, reacting a compound of the formula

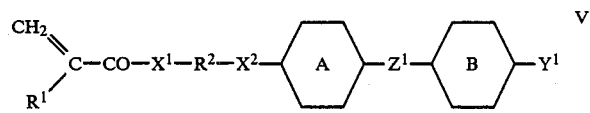

and a compound of the formula

wherein one of the groups $Y^1$ and $Y^2$ stands for —COOH and the other of the groups $Y^1$ and $Y^2$ stands for —NH$_2$, $Z^1$ denotes a single covalent bond, —CH$_2$CH$_2$—, —CH$_2$—O—, —OCH$_2$—, —N≡N—, —CONH— or —NHCO— and $R^1$, $R^2$, $R^3$, $X^1$, $X^2$ and rings A, B and C have the significances given in formula II, or suitable derivatives of these compounds, or (c) reacting a compound of the formula $$CH_2=CR^1-COOH \qquad \qquad VII$$

and a compound of the formula

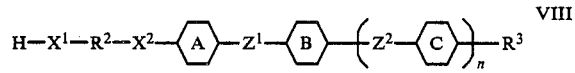

wherein $R^1$, $R^2$, $R^3$, $X^1$, $X^2$, $Z^1$, $Z^2$, n and rings A, B and C have the significances given in formula II, or suitable derivatives of these compounds.

The compounds of formulas IV, VI and VIII are known or are analogues of known compounds. In particuar, such compounds have already been described as intermediates for the preparation of liquid crystals, for example, in the literature references given in D. Demus et al., Flüssige Kristalle in Tabellen, Band I (1976) and Band II (1984), VEB Deutscher Verlag für Grundstoffindustrie, Leipzig. The amides of formula VIII can also be prepared, for example, in analogy to the corresponding esters by effecting an amide linkage in place of the esterification. Suitable methods for the introduction of the group —$X^1H$ in formula VIII are known to the person skilled in the art, for example from the preparation of known side-chain polymers and from the preparation of low-molecular liquid crystals having hetero atoms in the side-chain.

The compounds of formula VII are known building elements for the preparation of acrylate polymers.

The compounds of formulas III and V are also known to some extent, for example, from DE-A-2722589, Makromol. Chem. 183, 2311-2321 (1982), Makromol. Chem., Rapid Commun. 5, 393-398 (1984) and SPIE Vol. 682 Molecular and Polymeric Optoelectronic Materials, Fundamentals and Applications (1986), pp 56-64. The compounds of formula III can be prepared, for example, by reacting a compound of formula VII and a compound of the formula

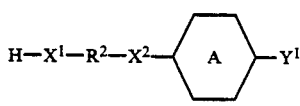

IX wherein $R^2$, $X^1$, $X^2$, $Y^1$ and ring A have the significances given in formula III, or suitable derivatives of these compounds. The compounds of formula V can be prepared analogously, for example by reacting a compound of formula VII and a compound of the formula

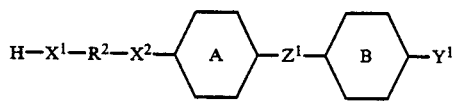

X wherein $R^2$, $X^1$, $X^2$, $Y^1$, $Z^1$ and rings A and B have the significances given in formula V, or suitable derivatives of these compounds.

Suitable derivatives of the carboxylic acids of formulas III-VII are, for example, the acid chlorides and the acid bromides. They can be obtained from the carboxylic acids according to known methods, for example by reaction with thionyl chloride, thionyl bromide, phosphorus oxychloride, phosphorous oxybromide, phosphorus pentachloride and the like.

The production of the compounds of formula II in accordance with process variants (a) and (b) above as well as the reactions of the compounds of formula VII or suitable derivatives of these compounds with the compounds of formulas VIII-X in which $X^1$ stands for —NH— or —N(CH₃)— can be carried out in a manner known per se. The reaction can be effected under the usual conditions for the preparation of amides. As a rule, the amide formation is preferably effected by reacting the amine with the acid chloride or acid bromide. It is especially preferred to carry out the reaction in an ether, for example, tetrahydrofuran, and optionally in the presence of a tertiary amine, for example, triethylamine.

The reaction of the carboxylic acids of formula VII or of suitable derivatives of these compounds with compounds of formulas VIII-X in which $X^1$ is oxygen or sulfur can be effected according to esterification methods which are known per se. Preferably, a carboxylic acid of formula VII or its acid chloride or acid bromide is reacted with the alcohol or thiol. The reaction of the acid chlorides or acid bromides is conveniently effected in an inert organic solvent such as diethyl ether, tetrahydrofuran, dimethylformamide, benzene, toluene, cyclohexane, carbon tetrachloride and the like and/or in the presence of an acid-binding agent such as triethylamine or pyridine. The reaction of the carboxylic acids can be effected, for example, in the presence of 4-(dimethylamino)pyridine and N,N'-dicyclohexylcarbodiimide or in the presence of oxalyl chloride and dimethylformamide or in analogy to the processes described in DE-A-2722589 and FR-A-2573082.

Those polymers and intermediates of the above formulas in which $X^1$ denotes oxygen are generally preferred. Further, the acryl derivatives and the methacryl derivatives, that is, those compounds in which $R^1$ represents hydrogen or methyl, are generally preferred. $X^2$ in the above compounds preferably stands for a single covalent bond or for oxygen, especially for oxygen.

Groups $R^2$ without a hetero atom are generally preferred. However, if desired, $R^2$ can have an ether or thioether grouping, that is, a non-terminal methylene group in $R^2$ can be replaced by oxygen or sulfur, without thereby essentially altering the properties of the polymer. The length of the spacer group $R^2$ influences, inter alia, the melting point of the polymer, with a longer spacer generally leading to higher melting points. Preferably, $R^2$ is an alkylene group with 3-11, especially 3-8, carbon atoms or a group derived therefrom in which a non-terminal methylene group is replaced by oxygen or sulfur. For applications as crystals the spacer $R^2$ can, however, also be longer and can signify, for example, an alkylene group with 7-13 carbon atoms or a group derived therefrom. The group $R^2$ embraces straight-chain and branched groups. The straight-chain groups, that is, the group of the formula —$(CH_2)_p$—$X^3$—$(CH_2)_q$—, wherein $X^3$ denotes methylene, oxygen or sulfur, p and q are whole numbers of 1 to 13 and the sum p+q is 2-14, preferably 2-10 and especially about 2-7, are generally preferred. Polymethylene ($X^3$=methylene) such as trimethylene, tetramethylene, pentamethylene, hexa- methylene, heptamethylene and the like is especially preferred.

Preferably, rings A, B and C in the above formulas each independently denote 1,4-phenylene, pyridine-2,5-diyl, pyrimidine-2,5-diyl, pyrazine-2,5-diyl, pyridazine-3,6-diyl or ring C also denotes trans-1,4-cyclohexylene. If desired, the rings can have one or more lateral halogen, methyl, methoxy and/or cyano substituents in order to modify the phase transition temperatures, the dielectric anisotropy etc. Preferably, a maximum of one of rings A, B and C is a heterocyclic ring. Those polymers and intermediates in which ring A represents 1,4-phenylene or 1,4-phenylene which is substituted with halogen, methyl, methoxy and/or cyano, ring B denotes pyridine-2,5-diyl, pyrimidine-2,5-diyl, pyrazine-2,5-diyl, pyridazine-3,6-diyl, 1,4-phenylene or 1,4-phenylene which is substituted with halogen, methyl, methoxy and/or cyano and ring C is trans-1,4-cyclohexylene, 1,4-phenylene or 1,4-phenylene which is substituted with halogen, methyl, methoxy and/or cyano are especially preferred. Generally, 1,4-phenylene groups are preferably unsubstituted.

An optionally present azo group —N=N— for $Z^1$ or $Z^2$ is preferably present between 2 aromatic rings. A preferred group of polymers and intermediates in accordance with the invention comprises those in which $Z^1$ represents —CONH— or —NHCO— and $Z^2$ denotes a single covalent bond, —$CH_2CH_2$—, —$CH_2O$—, —$OCH_2$—, —N=N—, —CONH— or —NHCO—. In general, those in which $Z^1$ represents —CONH— are especially preferred. Further, in an especially preferred embodiment $Z^2$ stands for a single covalent bond or —N=N—.

An azo group —N=N— present in $Z^1$ or $Z^2$ or optionally in a comonomer permits an optical cis/trans isomerization. The disturbance of the liquid crystal phase which is thereby brought about can be utilized for the production of optical stores for example, in an analogous manner to the method described in Makromol. Chemie 8, 59 (1987) and 8, 467 (1987).

Especially preferred polymers in accordance with the invention are therefore those having a monomeric unit of the formula wherein $R^1$, $R^2$, $R^3$, $X^1$, $X^2$, $Z^1$, $Z^2$, n and rings A, B and C have the above significances; $R^4$ represents hydrogen or methyl; $R^5$ is polymethylene with 3–11 carbon atoms; $X^4$ denotes a single covalent bond or oxygen; ring D represents 1,4-phenylene, pyridine-2,5-diyl, pyrimidine-2,5-diyl, pyrazine-2,5-diyl or pyridazine-3,6-diyl; ring E represents 1,4-phenylene or trans-1,4-cyclohexylene; and $Z^3$ denotes a single covalent bond —CH$_2$CH$_2$—, —CH$_2$O—, —OCH$_2$—, —N=N—, —CONH— or —NHCO—; with the proviso that ring E represents 1,4-phenylene or ring C represents 1,4-phenylene or 1,4-phenylene which is substituted with halogen, methyl, methoxy and/or cyano when $Z^2$ or $Z^3$ denotes —N=N—.

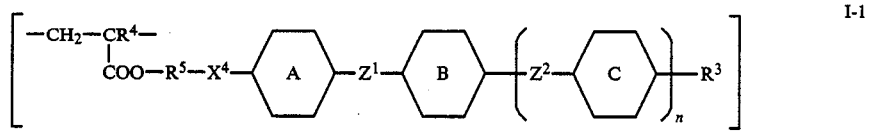

I-1 or

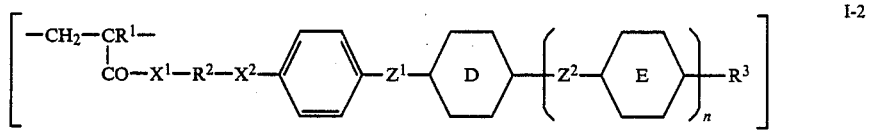

I-2 or

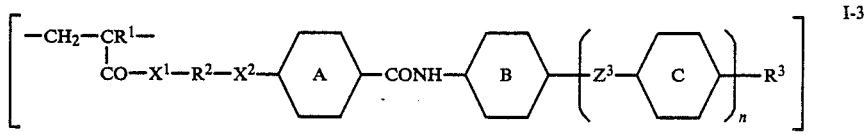

I-3 or

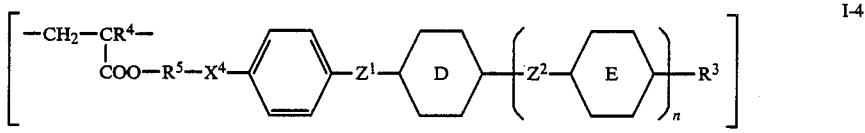

I-4 or

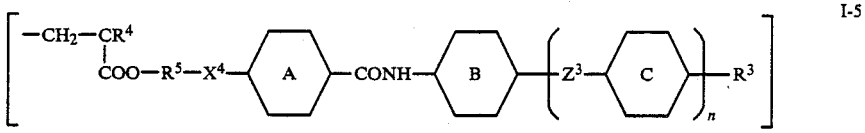

I-5 or

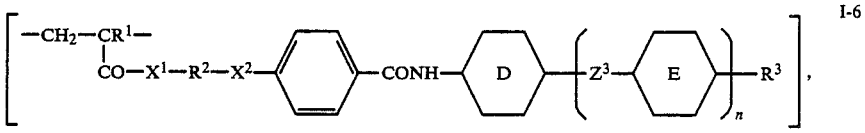

I-6 especially of the formula

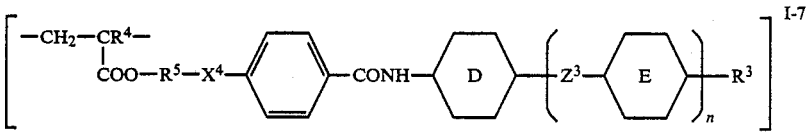

I-7

Especially preferred monomers of formula II are, accordingly, those in which the symbols have the significances corresponding to those in formulas I-1 to I-7.

Preferred polymethylene groups $R^5$ are those with 3-8 carbon atoms, especially hexamethylene. $X^4$ preferably stands for oxygen. $Z^3$ preferably is a single covalent bond or —N=N—. Ring D preferably denotes 1,4-phenylene, pyridine-2,5-diyl or pyrimidine-2,5-diyl, especially 1,4-phenylene. In general, ring E preferably stands for 1,4-phenylene.

In general, polymers having a monomeric unit in which n stands for the number 0 are preferred. However, where high phase transition temperatures are desired, monomers in which n stands for the number 1 are advantageously used.

Examples of preferred polymers in accordance with the invention are those which have as the monomeric unit one of the groups of the following formulas:

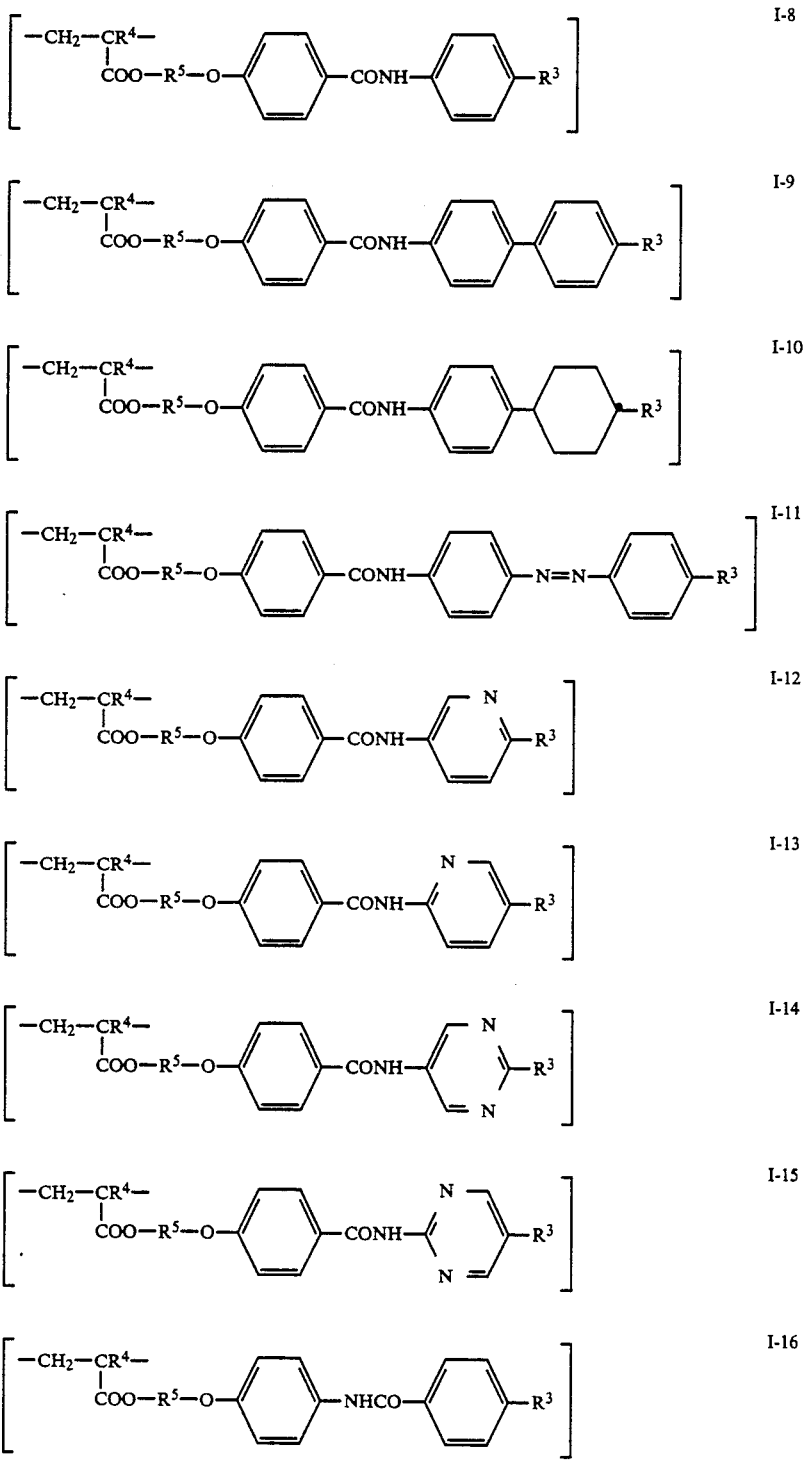

-continued

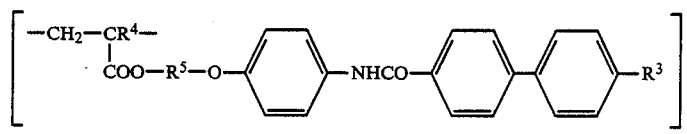
I-17

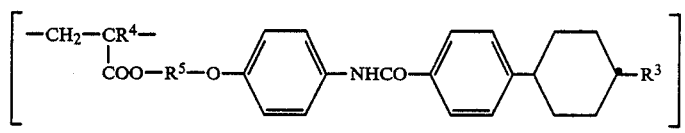
I-18

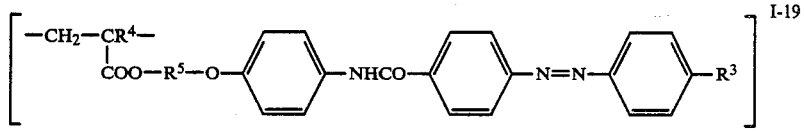
I-19

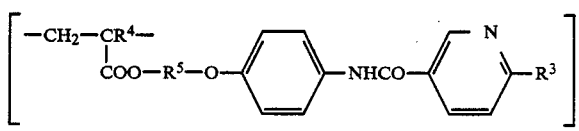
I-20

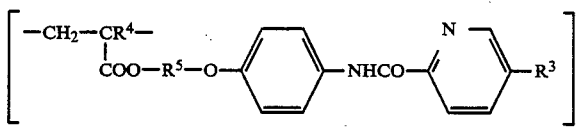
I-21

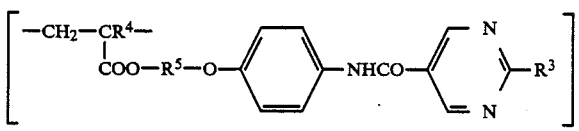
I-22

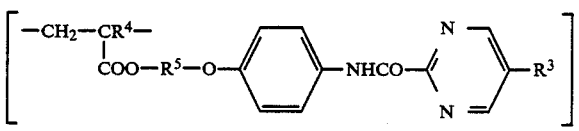
I-23 wherein $R^3$, $R^4$ and $R^5$ have the above significances.

Alkyl groups in which optionally one methylene group or two non-adjacent methylene groups is/are replaced by oxygen and/or sulfur, which may be present in $R^3$, can be straight-chain or branched and preferably have about 1-12, particularly about 1-7, carbon atoms. Such groups are preferably $C_1$-$C_{12}$-alkyl and $C_1$-$C_{12}$-alkoxy, especially $C_1$-$C_7$-alkyl and $C_1$-$C_7$-alkoxy.

$R^3$ in each of the above formulas I, II and I-1 to I-23 preferably stands for fluorine, chlorine, bromine, cyano, nitro, $C_1$-$C_{12}$-alkyl or $C_1$-$C_{12}$-alkoxy.

The polymers in accordance with the invention preferably have a glassy, a liquid crystalline and an isotropic phase or a crystalline-isotropic phase transition. As a rule, this can generally be achieved readily by suitable choice of the mesogenic group, of the spacer $R^2$ or $R^5$ and the like. For example, monomeric units of formula I in which n stands for the number 1 generally lead to the increase of all phase transition temperatures, while for example, halogen in $R^3$ leads primarily to comparatively high melting points and, on the other hand, alkoxy, alkyl etc. in $R^3$ leads primarily to comparatively low melting points and often to glass phases.

The properties of the polymers in accordance with the invention can also be varied considerably by copolymerizing monomers of formula II with one another and/or with other copolymers and by mixing the polymers in accordance with the invention with one another and/or with other materials. The copolymerization permits, for example, polymers having additional mesogens and/or optically active groups, with covalently bonded coloring substances, cross-linked polymers and the like. Such groups can be introduced by copolymerization with corresponding comonomers or by copolymerization with comonomers which have a reactive group and subsequent reaction of the copolymer with suitable compounds having the desired group. Alternatively, the polymers in accordance with the invention can also be mixed with one another and/or with other polymers, chiral doping substances, coloring substances, low-molecular liquid crystals and the like. From Makromol. Chem. Rapid. Commun. 1, 31 (1980) it is known for example, that by mixing substances having a low mol mass the glass transition temperature can be lowered substantially, while the clearing point is influenced to a relatively less extent. Suitable comonomers and mixture components are fundamentally known to the person skilled in the art and depend to a large extent on the field of application. The invention is accordingly also concerned especially with copolymerizates and mixtures.

The polymers in accordance with the invention are therefore homopolymers having a monomeric unit of formula I or copolymers having a monomeric unit of formula I and one or more additional monomeric units of formula I and/or one or more additional monomeric units different from formula I. The monomeric units of formula I are preferably groups of formulas I-1 to I-23. The amount of monomeric units of formula I depends, in the case of copolymers with other monomeric units, mainly on the character of these other units and on the purpose of use. In general, the fraction of one or more monomeric units of formula I in the polymer amounts to at least about 30%, preferably at least about 50%. The fraction of optionally present monomeric units different from formula I can accordingly generally amount to up to about 70%, for example about 0.1–70% and preferably about 1–50%.

The mixtures in accordance with the invention which have at least 2 components are characterized in that at least one component is a polymer having a monomeric unit of formula I, preferably one of formulas I-1 to I-23. The second component and, optionally, additional components can be for example, additional polymers having a monomeric unit of formula I, other side-chain polymers, compounds having known optical properties, low-molecular liquid crystals and/or other additives which are usually used in polymers, for example, plasticizers. The amount of polymer having a monomeric unit of formula I generally depends on the nature of the additional components and on the purpose of use. The amount of one or more polymers having a monomeric unit of formula I generally amounts to at least about 30 wt. %, preferably at least about 50 wt. %. The amount of additional additives which may be present (that is, of additives which are not polymers having a monomeric unit of formula I) can accordingly amount to up to about 70 wt. %, for example about 0.1–70 wt. % and preferably about 1–50 wt. %. The mixtures in accordance with the invention preferably have a glass phase and/or a liquid crystalline phase.

The combination of liquid crystal properties and polymer properties, the large variation in these properties and the high stability and ready processing capability of the polymers in accordance with the invention opens up a wide range of applications, for example, as crystals, glasses, foils, films, membranes or liquid crystals. The polymers in accordance with the invention can therefore be used in the widest variety of technological ranges. Suitable fields of use are fundamentally known to the person skilled in the art, for example, from Angew. Chemie 99, 840 (1987). A preferred aspect is concerned with the use in optics (linear and non-linear optics), especially the use in integrated optics, in optoelectronics and/or for information storage. For this purpose, the polymers or polymer mixtures in accordance with the invention can serve as a matrix for the deposition of compounds having particular optical properties (for example, coloring substances, compounds having a large molecular hyperpolarizability etc.) or can have covalently bonded groups with such properties. A further preferred aspect is concerned with the use for the separation of mixtures of substances, especially the use for separating membranes for separating mixtures of gases and the use as liquid crystalline, stationary phases in gas chromatography. For the use for separating membranes, the polymers in accordance with the invention can also preferably be cross-linked.

Preferred comonomers which are suitable for the copolymerization with monomers of formula II are the compounds of the formula

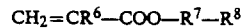

$$CH_2=CR^6-COO-R^7-R^8 \qquad XI$$

wherein $R^6$ represents hydrogen, methyl, ethyl, fluorine, chlorine, bromine, cyano or phenyl; $R^7$ is alkylene with 1–15 carbon atoms; and $R^8$ denotes a mesogenic group without an amide function, a coloring substance radical, a group having non-linear optical properties (especially a group having large molecular hyperpolarizability) or —NCO, oxacyclopropyl —$C_2H_3O$, hydroxy or carboxy.

Preferred copolymers with comonomers different from formula II are accordingly those which have as the monomeric unit one or more groups of formual I and one or more groups of the formula

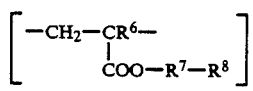

$$\left[ \begin{array}{c} -CH_2-CR^6- \\ | \\ COO-R^7-R^8 \end{array} \right] \qquad XII$$

wherein $R^6$, $R^7$ and $R^8$ have the above significances.

$R^6$ preferably stands for hydrogen or methyl. $R^7$ preferably is straight-chain alkylene (that is, methylene or polymethylene) with 1–15, especially 1–11, carbon atoms.

Suitable mesogenic groups $R^8$ are known to the person skilled in the art, for example, from EP-A-7574, EP-A-171045, EP-A-188785, EP-A-230898, GB-A-2185487, DE-A-2722589 and SPIE Vol. 682, Molecular and Polymeric Optoelectronic Materials, Fundamentals and Application, pp 56–64 (1986). Of such copolymers there are preferred those which have as the monomeric unit one or more groups of formula I and one or more groups of the formula

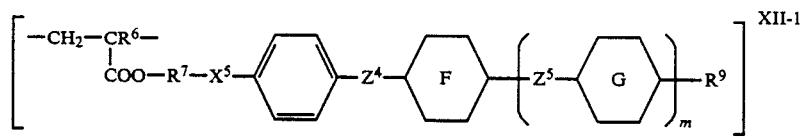

wherein $X^5$ denotes a single covalent bond or oxygen; ring F is pyrimidine-2,5-diyl, 1,4-phenylene or 1,4-phenylene which is substituted with halogen, methyl, methoxy and/or cyano; ring G represents 1,4-cyclohexylene, 1,4-phenylene or 1,4-phenylene which is substituted with halogen, methyl, methoxy and/or cyano; $Z^4$ and $Z^5$ each independently denote a single covalent bond, —COO—, —OOC—, —$CH_2CH_2$—, —$CH_2O$—, —$OCH_2$—, —CH=CH— or —N=N—; m stands for the number 0 or 1; $R^9$ represents hydrogen, halogen, cyano, nitro, alkyl or alkoxy; and $R^6$ and $R^7$ have the above significances.

The properties of the polymers in accordance with the invention can also be modified by for example, mixing a polymer which has a monomeric unit of formula XII-1 with the polymer in accordance with the invention. Such mixtures can be monophasic or multiphasic.

In formula XII-1 above ring F preferably stands for 1,4-phenylene, fluoro-1,4-phenylene or pyrimidine-2,5-diyl and ring G preferably stands for 1,4-phenylene, fluoro-1,4-phenylene or trans-1,4-cyclohexylene. One of the groups $Z^4$ and $Z^5$ (preferably $Z^5$) preferably stands for a single covalent bond. The alkyl and alkoxy residues $R^9$ can be straight-chain or branched and preferably have 1–12 carbon atoms.

Suitable coloring substances and radicals $R^8$ of coloring substances are known to the person skilled in the art, for example, from EP-A-171045. Fundamentally, all usual dichroic coloring substances which are suitable for use in liquid crystals can be used, especially the azo, anthraquinone, stilbene and cyanin coloring substances. The term "coloring substance radical" denotes herein a radical which is obtained formally from the coloring substance molecule by cleavage of a hydrogen atom or an alkyl group, that is, the spacer group $R^7$ replaces a hydrogen atom or an alkyl group. Such colored polymers are suitable for example, as colored liquid crystals or as materials for optical storage media. Covalently bonded coloring substances permit a relatively high and temperature-independent coloring substance concentration. If desired, however, the coloring substance can also be admixed with the polymer.

Suitable compounds and groups $R^8$ having non-linear optical properties, especially with a large molecular hyperpolarizability, are known to the person skilled in the art, for example, from EP-A-230898, GB-A-2185487, U.S. Pat. No. 4,659,177, Macromolecules 15, 1385 (1982) and SPIE Vol. 682, Molecular and Polymeric Optoelectronic Materials, Fundamentals and Application, pp. 56–64 (1986). Examples of preferred compounds and, respectively, groups are urea and its derivatives (for example, derivatives having one or more alkyl and/or aryl residues), p-nitroaniline and its derivatives (for example, N-alkyl-p-nitroaniline and N,N-dialkyl-p-nitroaniline), stilbene coloring substances such as 4-amino-4'-nitrostilbene, 4-hydroxy-4'-nitrostilbene and its derivatives (for example, 4-alkylamino-4-nitrostilbene, 4-dialkylamino-4'-nitrostilbene and 4-alkoxy-4'-nitrostilbene), cyanin coloring substances and the like as well as groups derived therefrom, preferably those which are obtained formally by cleaving a hydrogen atom or an alkyl group on the electron donor group. The compounds having a large molecular hyperpolarizability can therefore be covalently bonded to the polymer or can be admixed with the polymer. Such materials permit the alteration of the amplitude, frequency and phase of incident light. They are primarily of interest in non-linear optics for producing the second harmonic oscillation, since they permit a frequency duplication of laser light.

In known side-chain polymers polar guest molecules or segments of molecules often lead to the formation of certain domains having antiparallel arrangements of these guest molecules or segments of molecules. However, this largely centrosymmetrical arrangement prevents the generation of the second harmonic oscillation, which makes the production of suitable materials having non-linear optical properties considerably more difficult. Having regard to their high polarity and their capability of forming hydrogen bridges, the polymers in accordance with the invention are substantially better suited for the imbedding of polar molecules and segments of molecules. The formation of polar domains is at the same time largely suppressed.

Copolymers having one or more monomeric units of formula XII in which $R^8$ is —NCO, oxacyclopropyl, hydroxy or carboxy permit, after polymerization has been effected, the covalent bonding of mesogenic groups, coloring substance radicals, groups having a large molecular hyperpolarizability and the like or a cross-linking of the polymer. Suitable comonomers and the reaction of these groups are fundamentally known to the person skilled in the art, for example, from Houben-Weyl Volume XIV, part 1, pp. 1010–1079. The isocyanato group is suitable, for example, for the addition of primary and secondary amines (formation of a urea group) or, in the presence of a tertiary amine, also for the addition of alcohols (formation of a urethane group). To the oxacyclo propyl group (epoxide) there can be added, for example, in the presence of salicylyl aldehyde amines or carboxylic acids with the formation of β-hydroxy-substituted amines or esters. The hydroxy group can be esterified, for example, with carboxylic acids and the carboxy group can be esterified, for example, with hydroxy compounds. Further, a cross-linking of the polymer can be effected in this manner by reaction with compounds which have 2 or more amino, hydroxy or carboxy groups, such as for example, ethylenediamine, glycol, oxalic acid and the like.

Cross-linked polymers (elastomers) in accordance with the invention can preferably also be obtained by carrying out the polymerization in the presence of a comonomer which has 2 or more polymerizable groups. Suitable comonomers for the cross-linking of the polymer are known to the person skilled in the art and, moreover, many of them are commercially available. For example, organopolysiloxanes which have at least 2 vinyl groups (DE-A-3505744) are suitable. Cross-linked polymers have an improved stability of form and are therefore generally preferred for example, in the preparation of separating membranes.

A preferred group of comonomers for the preparation of cross-linked polymers comprises the compounds of the formula

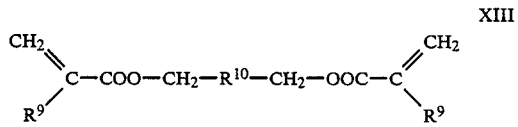

XIII wherein $R^{10}$ is a single covalent bond, alkylene with 1–15 carbon atoms, $CH_2=CR^9—COO—CH<$ or $(CH_2=CR^9—COO)_2C<$ and $R^9$ represents hydrogen, methyl, ethyl, fluorine, chlorine, bromine, cyano or phenyl.

Examples of preferred comonomers of formula XIII are the acrylate and methacrylate of glycol, 1,4-butanediol, 1,6-butanediol, glycerol and pentaerythritol. Preferred elastomers in accordance with the invention are therefore those which have, in addition to one or more monomeric units of formula I, the cross-linked groups corresponding to formula XIII.

The invention is illustrated in more detail by the following Examples. In the details relating to phase type or to phase transition temperatures C. is a crystalline phase, G is a glass phase, S is a smectic phase, N is a nematic phase, Ch is a cholesteric phase and I is the isotropic phase. Unless indicated otherwise (such as by present or future tense verbs) the examples were carried out as written.

Example 1

90.1 g of acrylic acid (1.25 mol), 29.8 g of 4-(6-hydroxyhexyloxy)benzoic acid, 4.5 g of hydroquinone, 4.5 g of p-toluenesulfonic acid and 300 ml of chloroform were placed in a sulfonation flask having a stirrer, water separator and reflux condenser. The mixture was heated to reflux for about 20 hours and then treated with a solution of 3.25 g of sodium acetate trihydrate in 10 ml of water. The chloroform and the excess acrylic acid were subsequently distilled off on a rotary evaporator. The residue was taken up in 1.5 l of chloroform. The mixture was stirred for 2 hours and then filtered. The filtrate was washed three times with 200 ml of water each time, dried over sodium sulfate, filtered and concentrated. The residue was dissolved in 500 ml of toluene and the solution was again filtered. The filtrate was cooled to 4° C. for 12 hours and then to −20° C. for a further 12 hours. The crystalline product obtained was removed by filtration under suction, washed twice with cold toluene and again recrystallized from 400 ml of toluene. After drying at 60° C./40 mbar there were obtained 29.2 g of 4-(6-acrylyloxyhexyloxy)benzoic acid with m.p. (C-N) 92° C. and cl.p. (N-I) 110° C.

The following compounds can be prepared in an analogous manner:

4-(3-Acrylyloxypropyloxy)benzoic acid;
4-(4-acrylyloxybutyloxy)benzoic acid;
4-(5-acrylyloxypentyloxy)benzoic acid;
4-(7-acrylyloxyheptyloxy)benzoic acid;
4-(8-acrylyloxyoctyloxy)benzoic acid;
4-(3-methacrylyloxypropyloxy)benzoic acid, m.p. 157°–158° C.;
4-(4-methacrylyloxybutyloxy)benzoic acid;
4-(5-methacrylyloxypentyloxy)benzoic acid;
4-(6-methacrylyloxyhexyloxy)benzoic acid; m.p. (C-N) 92° C., cl.p. (N-I) 101° C.;
4-(7-methacrylyloxyheptyloxy)benzoic acid;
4-(8-methacrylyloxyoctyloxy)benzoic acid;
4-(9-methacrylyloxynonyloxy)benzoic acid;
4-(10-methacrylyloxydecyloxy)benzoic acid;
4-(11-methacrylyloxyundecyloxy)benzoic acid, m.p. (C-I) 116.5°–117.3° C., cl.p. (N-I) 105° C.

Example 2

5 g of 4-(6-acrylyloxyhexyloxy)benzoic acid are dissolved in 50 ml of thionyl chloride and then treated with one drop of dimethylformamide. The mixture was stirred at room temperature for 24 hours. Subsequently, the excess thionyl chloride was distilled off, the residue was dissolved in 50 ml of dry tetrahydrofuran and the solution was again concentrated.

The acid chloride obtained was dissolved in 25 ml of tetrahydrofuran and this solution was added dropwise within 30 minutes at 0° C. to a mixture of 2.1 g of 4-methoxyaniline, 2.0 g of triethylamine and 30 ml of tetrahydrofuran. The reaction mixture was stirred at room temperature for one day, then treated with 200 ml of chloroform, washed twice with 50 ml of water each time, dried over sodium sulfate, filtered and concentrated. The residue was purified by chromatography on silica gel with ethyl acetate/hexane (vol. 8:12). Recrystallization of the resulting product from ethyl acetate/hexane finally gave 5.8 g of 4-(6-acrylyloxyhexyloxy)-benzoic acid 4-methoxyanilide with m.p. 139° C.

The following compounds can be prepared in an analogous manner:

4-(3-Acrylyloxypropyloxy)benzoic acid 4-methylanilide;
4-(3-acrylyloxypropyloxy)benzoic acid 4-methoxyanilide;
4-(3-acrylyloxypropyloxy)benzoic acid 4-fluoroanilide;
4-(3-acrylyloxypropyloxy)benzoic acid 4-chloroanilide;
4-(3-acrylyloxypropyloxy)benzoic acid 4-bromoanilide;
4-(3-acrylyloxypropyloxy)benzoic acid 4-cyanoanilide;
4-(3-acrylyloxypropyloxy)benzoic acid N-(4'-cyano-4-biphenylyl)amide;
4-(3-methacrylyloxypropyloxy)benzoic acid 4-methylanilide;
4-(3-methacrylyloxypropyloxy)benzoic acid 4-methoxyanilide;
4-(3-methacrylyloxypropyloxy)benzoic acid 4-fluoroanilide;
4-(3-methacrylyloxypropyloxy)benzoic acid 4-chloroanilide;
4-(3-methacrylyloxypropyloxy)benzoic acid 4-bromoanilide;
4-(3-methacrylyloxypropyloxy)benzoic acid 4-cyanoanilide;
4-(3-methacrylyloxypropyloxy)benzoic acid 4-nitroanilide, m.p. 128.9°–131.8° C.,
4-(3-methacrylyloxypropyloxy)benzoic acid N-(4'-cyano-4-biphenylyl)amide;
4-(4-acrylyloxybutyloxy)benzoic acid 4-methoxyanilide;
4-(4-acrylyloxybutyloxy)benzoic acid 4-fluoroanilide;
4-(4-acrylyloxybutyloxy)benzoic acid 4-chloroanilide;
4-(4-acrylyloxybutyloxy)benzoic acid 4-bromoanilide;
4-(4-acrylyloxybutyloxy)benzoic acid 4-cyanoanilide;
4-(4-acrylyloxybutyloxy)benzoic acid N-(4'-cyano-4-biphenylyl)amide;
4-(4-methacrylyloxybutyloxy)benzoic acid 4-methoxyanilide;
4-(4-methacrylyloxybutyloxy)benzoic acid 4-fluoroanilide;
4-(4-methacrylyloxybutyloxy)benzoic acid 4-chloroanilide;
4-(4-methacrylyloxybutyloxy)benzoic acid 4-bromoanilide;
4-(4-methacrylyloxybutyloxy)benzoic acid 4-cyanoanilide;
4-(4-methacrylyloxybutyloxy)benzoic acid N-(4'-cyano-4-biphenylyl)amide;
4-(5-acrylyloxypentyloxy)benzoic acid 4-methoxyanilide;
4-(5-acrylyloxypentyloxy)benzoic acid 4-fluoroanilide;
4-(5-acrylyloxypentyloxy)benzoic acid 4-chloroanilide;
4-(5-acrylyloxypentyloxy)benzoic acid 4-bromoanilide;
4-(5-acrylyloxypentyloxy)benzoic acid 4-cyanoanilide;
4-(5-acrylyloxypentyloxy)benzoic acid N-(4'-cyano-4-biphenylyl)amide;
4-(5-methacrylyloxypentyloxy)benzoic acid 4-methoxyanilide;
4-(5-methacrylyloxypentyloxy)benzoic acid 4-fluoroanilide;
4-(5-methacrylyloxypentyloxy)benzoic acid 4-chloroanilide;
4-(5-methacrylyloxypentyloxy)benzoic acid 4-bromoanilide;
4-(5-methacrylyloxypentyloxy)benzoic acid 4-cyanoanilide;
4-(5-methacrylyloxypentyloxy)benzoic acid N-(4'-cyano-4-biphenylyl)amide;

4-(6-acrylyloxyhexyloxy)benzanilide;
4-(6-acrylyloxyhexyloxy)benzoic acid 4-methylanilide;
4-(6-acrylyloxyhexyloxy)benzoic acid 4-pentylanilide;
4-(6-acrylyloxyhexyloxy)benzoic acid 4-butyloxyanilide;
4-(6-acrylyloxyhexyloxy)benzoic acid 4-fluoroanilide, m.p. 120.9° C.;
4-(6-acrylyloxyhexyloxy)benzoic acid 4-chloroanilide, m.p. 149.6° C.;
4-(6-acrylyloxyhexyloxy)benzoic acid 4-bromoanilide, m.p. 163.3° C.;
4-(6-acrylyloxyhexyloxy)benzoic acid 4-cyanoanilide, m.p. 124.3° C.;
4-(6-acrylyloxyhexyloxy)benzoic acid 4-nitroanilide;
4-(6-acrylyloxyhexyloxy)benzoic acid N-(4'-methoxy-4-biphenylyl)amide;
4-(6-acrylyloxyhexyloxy)benzoic acid N-(4'-fluoro-4-biphenylyl)amide;
4-(6-acrylyloxyhexyloxy)benzoic acid N-(4'-cyano-4-biphenylyl)amide, m.p. (C-N) 174.2° C., cl.p. (N-I) 211.4° C.;
4-(6-methacrylyloxyhexyloxy)benzanilide;
4-(6-methacrylyloxyhexyloxy)benzoic acid 4-methylanilide;
4-(6-methacrylyloxyhexyloxy)benzoic acid 4-pentylanilide;
4-(6-methacrylyloxyhexyloxy)benzoic acid 4-methoxyanilide, m.p. 135.5° C.;
4-(6-methacrylyloxyhexyloxy)benzoic acid 4-butyloxyanilide;
4-(6-methacrylyloxyhexyloxy)benzoic acid 4-fluoroanilide, m.p. 119.8° C.;
4-(6-methacrylyloxyhexyloxy)benzoic acid 4-chloroanilide, m.p. 146.6° C.;
4-(6-methacrylyloxyhexyloxy)benzoic acid 4-bromoanilide, m.p. 159.8° C.;
4-(6-methacrylyloxyhexyloxy)benzoic acid 4-cyanoanilide, m.p. 131.7° C.;
4-(6-methacrylyloxyhexyloxy)benzoic acid 4-nitroanilide; m.p. 136.5°–138.5° C.;
4-(6-methacrylyloxyhexyloxy)benzoic acid N-(4'-methoxy-4-biphenylyl)amide;
4-(6-methacrylyloxyhexyloxy)benzoic acid N-(4'-fluoro-4-biphenylyl)amide;
4-(6-methacrylyloxyhexyloxy)benzoic acid N-(4'-cyano-4-biphenylyl)amide, m.p. (C-N) 130.0° C., cl.p. (N-I) 181.4° C.;
4-(6-methacrylyloxyhexyloxy)benzoic acid N-(5-nitro-2-pyridyl)amide, m.p. 117°–119° C.;
4-(7-acrylyloxyheptyloxy)benzoic acid 4-methoxyanilide;
4-(7-acrylyloxyheptyloxy)benzoic acid 4-fluoroanilide;
4-(7-acrylyloxyheptyloxy)benzoic acid 4-chloroanilide;
4-(7-acrylyloxyheptyloxy)benzoic acid 4-bromoanilide;
4-(7-acrylyloxyheptyloxy)benzoic acid 4-cyanoanilide;
4-(7-acrylyloxyheptyloxy)benzoic acid N-(4'-cyano-4-biphenylyl)amide;
4-(7-methacrylyloxyheptyloxy)benzoic acid 4-methoxyanilide;
4-(7-methacrylyloxyheptyloxy)benzoic acid 4-fluoroanilide;
4-(7-methacrylyloxyheptyloxy)benzoic acid 4-chloroanilide;
4-(7-methacrylyloxyheptyloxy)benzoic acid 4-bromoanilide;
4-(7-methacrylyloxyheptyloxy)benzoic acid 4-cyanoanilide;
4-(7-methacrylyloxyheptyloxy)benzoic acid N-(4'-cyano-4-biphenylyl)amide;
4-(8-acrylyloxyoctyloxy)benzoic acid 4-methoxyanilide;
4-(8-acrylyloxyoctyloxy)benzoic acid 4-fluoroanilide;
4-(8-acrylyloxyoctyloxy)benzoic acid 4-chloroanilide;
4-(8-acrylyloxyoctyloxy)benzoic acid 4-bromoanilide;
4-(8-acrylyloxyoctyloxy)benzoic acid N-(4'-cyano-4-biphenylyl)amide;
4-(8-methacrylyloxyoctyloxy)benzoic acid 4-methoxyanilide;
4-(8-methacrylyloxyoctyloxy)benzoic acid 4-fluoroanilide;
4-(8-methacrylyloxyoctyloxy)benzoic acid 4-chloroanilide;
4-(8-methacrylyloxyoctyloxy)benzoic acid 4-bromoanilide;
4-(8-methacrylyloxyoctyloxy)benzoic acid 4-cyanoanilide;
4-(8-methacrylyloxyoctyloxy)benzoic acid 4-nitroanilide;
4-(8-methacrylyloxyoctyloxy)benzoic acid N-(4'-cyano-4-biphenylyl)amide;
4-(9-methacrylyloxynonyloxy)benzoic acid 4-nitroanilide;
4-(10-methacrylyloxydecyloxy)benzoic acid 4-nitroanilide;
4-(11-methacrylyloxyundecyloxy)benzoic acid 4-nitroanilide, m.p. 127°–132° C.

Example 3

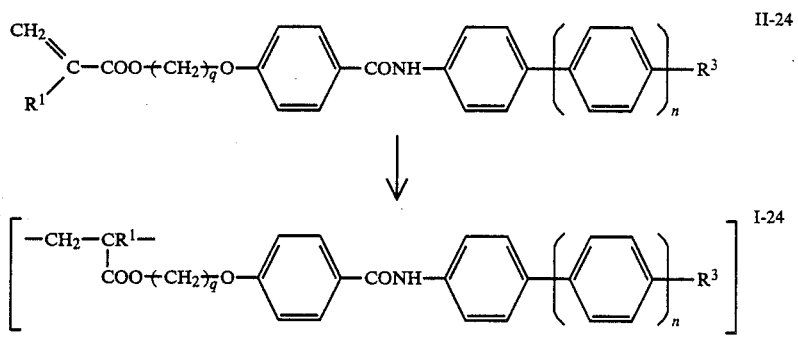

0.5 g of amide of formula II-24 and 5 mg of azoisobutyronitrile were dissolved in 5.9 ml of dimethylformamide. The solution was evacuated twice and then each time gassed with nitrogen (99.999%). After renewed evacuation the solution was heated to 60° C. The reaction time amounted to 18 hours in the case of the acrylates ($R^1$=H) and to 24 hours in the case of the methacrylates ($R^1$=CH$_3$). Subsequently, the reaction mixture was poured into 500 ml of methanol. The separated polymer was removed by filtration and dissolved in 20 ml of dimethylformamide. This solution was filtered through a 3 μm filter and added dropwise to 500 ml of methanol cooled to −78° C. The mixture was stirred for 5 hours while warming to room temperature. Subsequently, the separated homopolymer was removed by filtration.

The educts of formula II-24 used, the homopolymers having a monomeric unit of formula I-24 obtained as well as the degree of polymerization and the phase transition temperatures of the homopolymers are compiled in Table 1. The number average $M_n$ of the molecular weight and the weight average $M_w$ of the molecular weight were measured by gel permeation chromatography on Ultrastyragel columns of the firm Waters with dimethylformamide (1 ml/minute) and lithium bromide (0.02 mol/l) as the mobile phase and using a refractive index detector. The numerical values given are relative values based on polystyrene standards measured under the same conditions. $M_w/M_n$ is a measure for the breadth of the molecular weight distribution. The phase transition temperatures were determined by polarization microscopy and with differential thermoanalysis; the values given are average values.

TABLE 1

| Educt or product | | | $M_n$ | | Phase transition |
|---|---|---|---|---|---|
| $R^1$ | q | n | $R^3$ | (g/mol) | $M_w/M_n$ | (°C.) |
| H | 6 | 0 | —OCH₃ | 27000 | 1.88 | G. 54. S. 130. I |
| H | 6 | 0 | —F | 35000 | 1.24 | C. 106. S. 139. I |
| H | 6 | 0 | —Cl | 31100 | 1.13 | C. 163. S. 189. I |
| H | 6 | 0 | —Br | 17200 | 1.55 | C. 168. I |
| H | 6 | 0 | —CN | 38800 | 1.26 | C. 91. S. 142. I |
| CH₃ | 6 | 0 | —OCH₃ | 52800 | 3.40 | G. 74. S. 127. I |
| CH₃ | 6 | 0 | —F | 93900 | 1.67 | C. 118. I. |
| CH₃ | 6 | 0 | —Cl | 118000 | 2.20 | C. 142. S. 177. I |
| CH₃ | 6 | 0 | —Br | 28400 | 2.03 | C. 177. I |
| CH₃ | 6 | 0 | —CN | | | C. 80. S. 117. I |
| CH₃ | 6 | 1 | —CN | 53600 | 2.31 | C. 153. S. 325. I |

The following monomers can be polymerized to the homopolymer in an analogous manner:
4-(3-methacrylyloxypropyloxy)benzoic acid 4-nitroanilide;
4-(6-methacrylyloxyhexyloxy)benzoic acid 4-nitroanilide;
4-(11-methacrylyloxyundecyloxy)benzoic acid 4-nitroanilide;
4-(6-methacrylyloxyhexyloxy)benzoic acid N-(5-nitro-2-pyridyl)amide.

Example 4

250 g of 4-(6-methacrylyloxyhexyloxy)benzoic acid 4-nitroanilide, 250 mg 4-nitro-4'-(6-methacrylyloxyhexyloxy)azobenzene and 5 mg of azoisobutyronitrile were dissolved in 5.9 ml of dimethylformamide. The solution was evacuated twice and then each time gassed with nitrogen (99.999%). After renewed evacuation the solution was heated to 60° C. for 24 hours. Subsequently, the reaction mixture was poured into 500 ml of methanol. The separated polymer was removed by filtration and dissolved in 20 ml of dimethylformamide. This solution was filtered through a 3 μm filter and added dropwise to 500 of methanol cooled to −78° C. The mixture was stirred 500 ml for 5 hours while warming to room temperature. Subsequently, the separated product was removed by filtration. There were obtained 330 mg of copolymer with glass transition temperature (G-N) 75° C. and cl.p. (N-I) 125° C.

Copolymers of the following monomers (weight ratio 1:1 in each case) are prepared in an analogous manner:
4-(6-methacrylyloxyhexyloxy)benzoic acid 4-methoxyanilide and
4-nitro-4'-(6-methacrylyloxyhexyloxy)azobenzene;
4-(6-methacrylyloxyhexyloxy)benzoic acid 4-cyanoanilide and 4-nitro-4'-(6-methacrylyloxyhexyloxy)azobenzene;
4-(3-methacrylyloxypropyloxy)benzoic acid 4-nitroanilide and 4-nitro-4'-(3-methacrylyloxypropyloxy)azobenzene;
4-(11-methacrylyloxyundecyloxy)benzoic acid 4-nitroanilide and 4-nitro-4'-(11-methacrylyloxyundecyloxy)azobenzene.

I claim:

1. A polymer comprising a monomeric unit of the formula

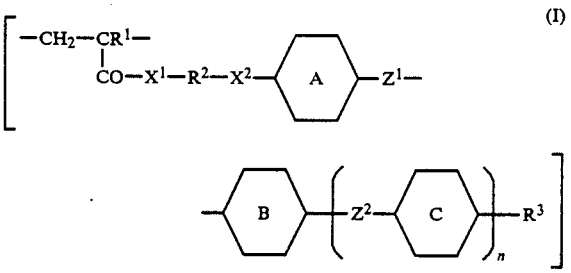

wherein $R^1$ is hydrogen, methyl, ethyl, fluorine, chlorine, bromine, cyano or phenyl; $X^1$ is oxygen, sulfur, —NH— or —N(CH₃)—; $R^2$ is alkylene with 3–15 carbon atoms, or alkylene with 3–15 carbon atoms in which a non-terminal methylene group thereof is replaced by oxygen or sulfur; $X^2$ is a single covalent bond, oxygen or sulfur; each of rings A and B independently is 1,4-phenylene which is unsubstituted or substituted with at least one of halogen, methyl, methoxy or cyano, or said unsubstituted or substituted 1,4-phenylene in which one CH group or two CH groups thereof is/are replaced by nitrogen; ring C is 1,4-phenylene which is unsubstituted or substituted with at least one of halogen, methyl, methoxy or cyano or said unsubstituted or substituted 1,4-phenylene in which optionally one CH group or two CH groups thereof is/are replaced by nitrogen or is trans-1,4-cyclohexylene; n is the integer 0, and $Z^1$ is —CONH— or —NHCO—; or n is the integer 1, one of the groups $Z^1$ and $Z^2$ is —CONH— or —NHCO—, and the other of the groups $Z^1$ and $Z^2$ is a single covalent bond, —CH₂CH₂—, —CH₂O—, —OCH₂—, —N=N—, —CONH— or —NHCO—; and $R^3$ is hydrogen, halogen, cyano, nitro, or alkyl in which one methylene group or two non-adjacent methylene groups thereof is/are replaced by at least one of oxygen or sulfur.

2. The polymer of claim 1, wherein $R^1$ is hydrogen or methyl, $X^1$ is oxygen and $X^2$ is a single covalent bond or oxygen.

3. The polymer of claim 1, wherein $R^2$ is alkylene with 3–11 carbon atoms.

4. The polymer of claim 3, wherein $R^1$ is polymethylene.

5. The polymer of any one of claim 1, wherein ring A is 1,4-phenylene or 1,4-phenylene which is substituted with at least one of halogen, methyl, methoxy or cyano;

ring B is pyridine-2,5-diyl, pyrimidine-2,5-diyl, pyrazine-2,5-diyl, pyridazine-2,5-diyl, 1,4-phenylene or 1,4-phenylene which is substituted with at least one of halogen, methyl, methoxy or cyano and ring C is trans-1,4-cyclohexylene, 1,4-phenylene or 1,4-phenylene which is substituted with at least one of halogen, methyl, methoxy or cyano.

6. The polymer of claim 1, wherein $Z^2$ is a single covalent bond, —CH$_2$CH$_2$—, —CH$_2$—O—, —OCH$_2$—, —N=N—, —CONH— or —NHCO— and $Z^1$ is —CONH or —NHCO—.

7. The polymer of claim 6, wherein $Z^1$ is —CONH—.

8. The polymer of claim 1, wherein the monomeric unit has the formula

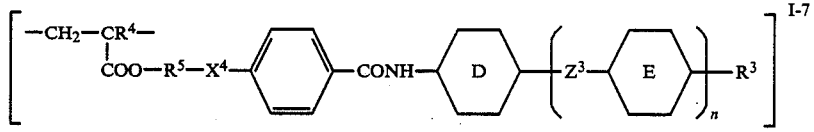

wherein $R^4$ is hydrogen or methyl; $R^5$ is polymethylene with 3-11 carbon atoms; $X^4$ is a single covalent bond or oxygen; ring D is 1,4-phenylene, pyridine-2,5-diyl, pyrimidine-2,5-diyl, pyrazine-2,5-diyl or pyridazine-3,6-diyl; ring E is 1,4-phenylene or trans-1,4-cyclohexylene; $Z^3$ is a single covalent bond, —CH$_2$CH$_2$—, —CH$_2$O—, —OCH$_2$—, —N=N—, —CONH— or —NHCO—; and n and $R^3$ have the significances given in claim 1.

9. The polymer of claim 1, wherein $R^3$ is fluorine, chlorine, bromine, cyano, nitro, $C_1$-$C_{12}$-alkyl or $C_1$-$C_{12}$-alkoxy.

10. The polymer of claim 1, having a number average molecular weight measured by gel permeation chromatography with dimethyl-formamide and polystyrene standards at about 5,000 to about 2,000,000 g/mol.

11. The polymer of claim 9, wherein the number average molecular weight thereof is about 10,000 to about 200,000 g/mol.

12. The polymer of claim 1, further comprising at least a second monomeric unit, wherein the monomeric unit of formula I amounts to at least about 30% of the total polymer.

13. The polymer of claim 11, wherein the monomeric unit of formula I amounts to at least about 50% of the total polymer.

14. A mixture having at least 2 components, wherein at least one of the components is a polymer having a monomeric unit of the formula:

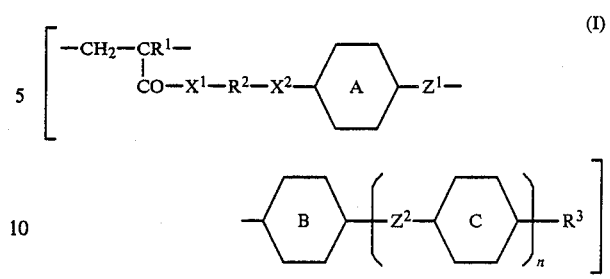

wherein $R^1$ is hydrogen, methyl, ethyl, fluorine, chlorine, bromine, cyano or phenyl; $X^1$ is oxygen, sulfur, —NH— or —N(CH$_3$)—; $R^2$ is alkylene with 3-15 carbon atoms, or alkylene with 3-15 carbon atoms in which a non-terminal methylene group thereof is replaced by oxygen or sulfur; $X^2$ is a single covalent bond, oxygen or sulfur; each of rings A and B independently is 1,4-phenylene which is unsubstituted or substituted with at least one of halogen, methyl, methoxy or cyano, or said unsubstituted or substituted 1,4-phenylene in which one CH group or two CH groups thereof is/are replaced by nitrogen; ring C is 1,4-phenylene which is unsubstituted or substituted with at least one of halogen, methyl, methoxy or cyano or said unsubstituted or substituted 1,4-phenylene in which optionally one CH group or two CH groups thereof is/are replaced by nitrogen or is trans-1,4-cyclohexylene; n is the integer 0, and $Z^1$ is —CONH— or —NHCO—; or n is the integer 1, one of the groups $Z^1$ and $Z^2$ is —CONH— or —NHCO—, and the other of the groups $Z^1$ and $Z^2$ is a single covalent bond, —CH$_2$CH$_2$—, —CH$_2$O—, —OCH$_2$—, —N=N—, —CONH— or —NHCO—; and $R^3$ is hydrogen, halogen, cyano, nitro, or alkyl in which one methylene group or two non-adjacent methylene groups thereof is/are replaced by at least one of oxygen or sulfur.

15. The polymer of claim 1, wherein $R^1$ is methyl, $X^1$ is oxygen, $R^2$ is hexamethylene, $X^2$ is oxygen, rings A and B are 1,4-phenylene, n is the integer 0, $Z^1$ is —CONH—, and $R^3$ is methoxy, fluorine or cyano.

16. The polymer of claim 1, wherein $R^1$ is hydrogen, $X^1$ is oxygen, $R^2$ is hexamethylene, $X^2$ is oxygen, rings A and B are 1,4-phenylene, n is the integer 0, $Z^1$ is —CONH—, and $R^3$ is methoxy, fluorine or cyano.

* * * * *